US005381009A

United States Patent [19]

Brownell

[11] Patent Number: 5,381,009

[45] Date of Patent: Jan. 10, 1995

[54] MOTION SENSOR ASSEMBLY

[75] Inventor: Greg A. Brownell, South Bend, Ind.

[73] Assignee: SEG Corporation, Mishawaka, Ind.

[21] Appl. No.: 69,932

[22] Filed: May 28, 1993

[51] Int. Cl.[6] .................. G08B 13/191; G08B 13/193; G01J 5/08

[52] U.S. Cl. .................................... 250/342; 250/353; 250/DIG. 1

[58] Field of Search ................. 250/342, 353, DIG. 1; 340/567, 600

[56] References Cited

U.S. PATENT DOCUMENTS

| | | | |
|---|---|---|---|
| 3,424,947 | 1/1969 | Warner et al. . | |
| 3,919,592 | 11/1975 | Gray . | |
| 3,958,118 | 5/1976 | Schwarz . | |
| 4,087,688 | 5/1978 | Keller | 250/353 X |
| 4,275,303 | 6/1981 | Mudge | 250/353 X |
| 4,447,726 | 5/1984 | Mudge et al. . | |
| 4,450,351 | 5/1984 | Fraden . | |
| 4,451,734 | 5/1984 | St. Jean et al. . | |
| 4,484,075 | 11/1984 | Kahl, Jr. et al. . | |
| 4,640,627 | 2/1987 | Tracy et al. | 250/342 X |
| 4,650,986 | 3/1987 | Maile | 340/567 X |
| 4,663,521 | 5/1987 | Maile | 340/567 X |
| 4,672,206 | 6/1987 | Suzuki et al. . | |
| 4,701,672 | 10/1987 | Sikora . | |
| 4,703,171 | 10/1987 | Kahl et al. . | |
| 4,734,585 | 3/1988 | Owers . | |
| 4,795,908 | 1/1989 | Morimoto et al. . | |
| 4,843,283 | 6/1989 | Chen | 340/567 X |
| 4,982,176 | 1/1991 | Schwarz | 250/342 X |
| 4,990,780 | 2/1991 | Lee et al. | 250/343 |
| 5,001,386 | 3/1991 | Sullivan et al. . | |
| 5,004,953 | 4/1991 | McDonald . | |
| 5,055,685 | 10/1991 | Sugimoto et al. | 250/342 |
| 5,128,654 | 7/1992 | Griffin et al. . | |

FOREIGN PATENT DOCUMENTS

| | | | |
|---|---|---|---|
| 3538592 | 5/1987 | Germany | 250/342 |
| 1-277796 | 11/1989 | Japan | 250/342 |
| 3-95480 | 4/1991 | Japan | 250/342 |
| 1551541 | 8/1979 | United Kingdom | 250/342 |

*Primary Examiner*—Constantine Hannaher
*Assistant Examiner*—Edward J. Glick
*Attorney, Agent, or Firm*—Barnes & Thornburg

[57] ABSTRACT

A motion sensor assembly has a housing with an opening therein, an infrared detector, a lens which may be of the Fresnel type, a holder, a circuit, and a transformerless direct current power supply that provides power to the circuit and detector. The housing has an interior space bounded by at least one wall. The opening is formed in the wall. The holder receives and secures both the lens and the detector so that the lens focuses a field of view on the detector. The holder also orients the detector and lens so as to reduce internal reflections between the lens and detector. The holder further mounts both the lens and the detector adjacent the opening in the wall. A radiation permeable covering disposed in the opening conceals the elements of the assembly within the interior space of the housing. In one embodiment, the radiation permeable covering includes louvers. When a source of infrared radiation moves across the field of view, the detector outputs a signal responsive to infrared energy radiated from the source. The circuit provides a signal in response to the output signal of the detector. A lamp may be driven by the signal of the circuit.

39 Claims, 3 Drawing Sheets

MOTION SENSOR ASSEMBLY

BACKGROUND AND SUMMARY OF THE INVENTION

The present invention relates to a motion sensor assembly. More particularly, the present invention relates to an infrared motion sensor assembly for use as a lamp switch. The motion sensor assembly is mounted adjacent an opening in a housing such that the assembly is concealed from view within an interior space of the housing. An infrared detector of the motion sensor assembly outputs a signal responsive to infrared energy radiated from a source present in a field of view of the motion sensor assembly. A circuit of the motion sensor assembly provides a signal in response to the output signal of the detector. The motion sensor assembly also has a transformerless direct current power supply.

Some research has shown that lighting can account for between 30% and 50% of the electric costs of a facility. Shutting off lights when they are not needed can reduce these costs. However, people often cannot or forget to turn off facility lights they are not using.

An infrared motion sensor assembly could be used as an on/off switch to control lighting of a facility. A field of view of such an assembly could, for example, cover a work area such as a desk. When a person moved toward a work area, he or she would radiate infrared energy that would be detected by the motion sensor assembly. The assembly could switch on lighting for use by the person when at the work area. After the person left the work area, infrared energy would no longer be radiated and detected by the motion sensor assembly. The assembly could switch off the lighting for the work area in order to conserve electric energy and thereby reduce facility costs.

Infrared motion sensor assemblies are known. Such assemblies have found application in such things as security devices. See, for example, U.S. Pat. No. 4,734,585 to Owers for a Passive Infra-Red Sensor. Current infrared motion sensor assemblies are often obtrusive and unattractive in appearance. Use in such environments as an office may be undesirable.

Infrared motion sensor assemblies, however, are not readily concealable from view because light must be able to enter the one or more lens elements thereof. Thus, some type of opening must be provided in a housing used to mount such an assembly. This opening may reveal the very motion sensor assembly that is intended to be concealed from view.

Another problem associated with the design and construction of infrared motion sensor assemblies is that of standing waves. Surfaces of lenses and infrared detectors used in motion sensor assemblies are reflective. Improper positioning and alignment of these reflective surfaces can create standing waves of infrared energy. These standing waves can impair the sensitivity of the infrared detector because the detector receives these reflected standing waves in addition to infrared radiation from other sources. Another problem associated with infrared motion sensor assemblies results from the heating of the detectors used therein. Heating of an infrared detector due to the absorption of infrared energy radiated from one or more sources can impair the sensitivity of a detector due to its low thermal mass. Air currents caused by convection and other sources pose a further problem to infrared motion sensor assemblies. These air currents can affect the sensitivity of infrared detectors used in these assemblies. A final problem can result from the electrical circuitry used in connection with these infrared motion sensor assemblies. Infrared detectors used in motion sensor assemblies are of a high sensitivity. Microvolt level signals can affect the response from these detectors. Thus, noise in the electrical circuitry of a motion sensor assembly can adversely impair the proper functioning of an infrared detector used in the assembly.

An infrared motion sensor assembly that solved the above-described problems would be a welcome improvement. Accordingly, the present invention comprises a housing having an interior space bounded by at least one wall. At least one opening is present in the wall of the housing. An infrared detector and a lens are mounted in the housing such that the lens is adjacent the infrared detector and the opening in the wall. The lens focuses a field of view on the detector. When a source of infrared radiation moves across the field of view focused on the detector, the detector outputs a signal responsive to infrared energy radiated from the source. The detector, lens, and structure used for mounting them are concealed from view within the interior space of the housing by a radiation-permeable covering disposed in the opening. In one embodiment, the radiation permeable covering comprises a plurality of louvers. A circuit is provided that provides a signal in response to the output signal of the detector.

The lens and detector may be mounted adjacent one another through the use of a holder having a body and structure for receiving and securing both the detector and the lens. The receiving and securing structure for the detector may comprise a slot into which the detector is disposed. The receiving and securing structure for the lens may comprise a groove formed in a portion of the holder that receives a periphery of the lens. In one embodiment, the holder is a two-piece assembly having first and second pieces. The first and second pieces are matingly connected to one another. The mating connection comprises at least one plug formed on the first body piece that is received into a corresponding socket formed in the second body piece. The slot for receiving and securing the detector is formed on the first piece such that the slot is open on one end. A stop is formed on the second piece that abuts against the open end when the first and second pieces are matingly connected.

The lens and detector may be mounted in the housing so that a plane along a longitudinal length of the lens is offset from a plane along a longitudinal length of the detector so as to reduce internal reflection is between the lens and the detector. In one embodiment, the plane of the lens and the plane of the detector may be offset by approximately five degrees.

In one embodiment of the invention, the lens is a Fresnel lens having at least one lens element that focuses a field of view on the detector. In yet another embodiment of the invention, the lens may be a Fresnel lens that has five lens elements that focus five fields of view on the detector. At least one aspect of the combined field of view focused on the detector by this five element Fresnel lens is greater than 90°.

The holder of the motion sensor assembly may form a sink for infrared energy absorbed by the detector. Such a sink will absorb some of the heat energy absorbed by the detector.

The motion sensor assembly may further comprise a circuit board on which at least a portion of the circuit is mounted. The circuit board in this embodiment is secured to the housing. The mounting structure or holder used to receive and secure the lens and detector may have structure thereon for attaching the mounting structure or housing to the circuit board. The attaching structure may comprise at least one post integrally formed on the mounting structure or housing. The circuit board, lens, and body of the holder preferably forms a seal around the detector to shield the detector from air currents which can affect its sensitivity.

The motion sensor assembly may further comprise a transformerless direct current power supply for supplying power to the alarm signal circuit and detector. The transformerless direct current power supply is connected to an alternating current power source. The transformerless direct current power supply has a direct current common bus connected to a neutral conductor of the alternating current power source. The common bus and neutral conductor are both connected to earth potential.

The direct current power supply may have circuitry connected between an input of the direct current power supply and a line conductor of the alternating current power supply that shifts a phase angle of an alternating current drawn by the direct current power supply from the alternating current power supply. The alternating current is phase-shifted so as to be out of phase with an alternating voltage drawn by the direct current power supply from the alternating current power supply. The phase shifting circuitry reduces the real power consumed by the transformerless direct current power supply. The phase shifting circuitry may comprise a capacitor that is connected in series with the input of the direct current power supply and the line conductor of the alternating current power supply.

The circuit may comprise an amplifier having an input that receives the output signal of the detector, a comparator having an input electrically connected to an output of the amplifier, a load control having an input electrically connected to an output of the comparator, and a load, having an input electrically connected to an output of the load control. In one embodiment, the amplifier comprises first- and second-stages. The first-stage amplifies the output signal of the detector and low pass filters the output signal of the detector to reduce electrical noise. The output of the first-stage is capacitively coupled to the second-stage amplifier. The second stage amplifier amplifies the change in detector output caused by motion of the source in the field of view. The comparator compares a signal output of the amplifier to determine whether the signal output of the amplifier is within a range of values set by a voltage divider of the comparator. The comparator outputs a signal to the load control when the signal output of the amplifier is outside of the range of values set by the voltage divider. The load control comprises a timer, an input of which is electrically connected to an output of the comparator, so that the timer is triggered by the output signal of the comparator. An input of a triac is electrically connected to an output of the timer. An output of the triac is electrically connected to the load. The load may comprise a lamp.

Other objects, advantages and novel features of the present invention will become apparent from the following detailed description of the invention when considered in conjunction with the accompanying drawings.

DETAILED DESCRIPTION OF THE DRAWINGS

Figure 1:
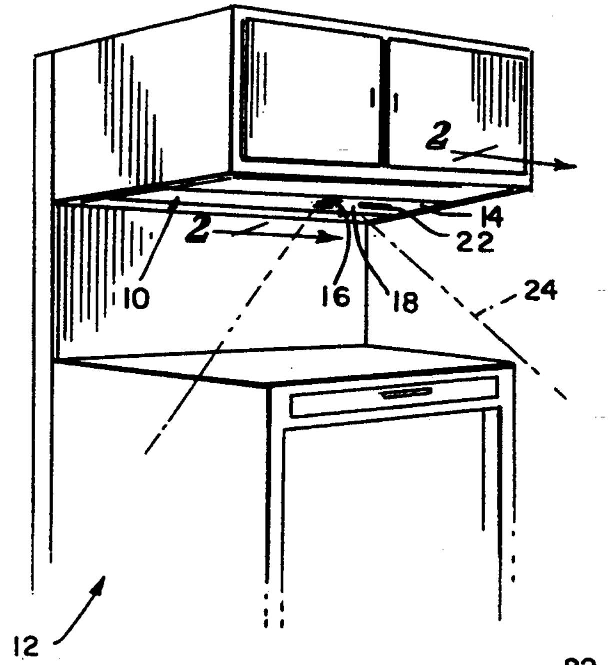
FIG. 1 is a perspective view of the housing of the motion sensor assembly of the present invention mounted in a work station area.
Figure 2:
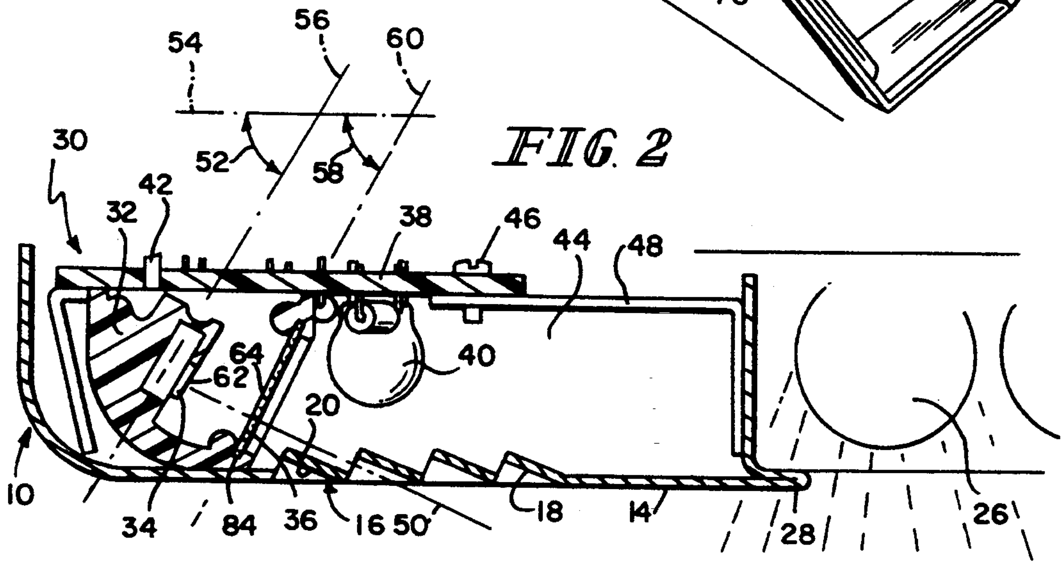
FIG. 2 is a sectional view along line 2—2 of FIG. 1 showing the motion sensor assembly mounted within an interior space of the housing.

FIG. 1 shows a housing 10 into which the motion sensor assembly of the present invention is mounted. Housing 10 is mounted in a work station area 12. Housing 10 includes a curved wall 14 having at least one opening 16 therein. A motion sensor assembly is positioned adjacent opening 16 as more fully discussed below in connection with FIG. 2. Opening 16 has a radiation permeable covering thereover such as louvers 18. Louvers 18 have faces 20 as shown in FIG. 2. Referring again to FIG. 1, a slide switch 22 is shown in wall 14 that can be connected to a potentiometer for controlling the amount of current received by a load such as a lamp. A field of view 24 covered by the motion sensor assembly is also shown in FIG. 1. Although only a single opening 16 is shown in wall 14 of housing 10, it is to be understood that housing 10 may have a plurality of motion sensor assemblies and openings therein. The use of multiple openings and motion sensor assemblies allows monitoring of multiple areas.

FIG. 2 shows a cross-sectional view through housing 10 taken along line 2—2 of FIG. 1. A fluorescent lamp 26 is shown adjacent housing 10. Lamp 26 is secured to housing 10 via lip 28. Motion sensor assembly 30 is shown in FIG. 2 as comprising a holder 32, a pyroelectric infrared detector 34, a lens, such as Fresnel lens 36, and circuit board 38. Circuit board 38 is shown as having a plurality of circuit components 40 mounted thereon. A post 42 attaches holder 32 to circuit board 38. Motion sensor assembly 30 is shown as being disposed in interior space 44 of housing 10 adjacent opening 16 in housing 10 such that motion sensor assembly 30 is concealed from view within interior space 44 of housing 10. This is intended to make motion sensor assembly 30 less obtrusive and work station area 12 therefore more aesthetically pleasing. A screw 46 attaches circuit board 38 to a mounting bracket 48 of housing 10. As can be seen in FIG. 2, holder 32, lens 36, and circuit board 38 form a seal around detector 34. This seal shields detector 34 from air currents, such as convection currents, which can affect the sensitivity of detector 34.

Infrared energy 50 radiated from a source (not shown) is shown entering between louvers 18 that cover opening 16. Although louvers 18 are shown, it is to be understood that other types of radiation permeable coverings may be used. Infrared energy 50 is focused on detector 34 by lens 36. Detector 34 outputs a signal responsive to infrared energy 50 radiated from the source. The output signal of detector 34 is in turn processed by circuit components 40 of circuit board 38 as more fully discussed below in connection with FIGS. 5 and 6.

A first angle 52 formed between vertical line 54 and a plane 56 along the longitudinal length of detector 34 is also shown in FIG. 2. A second angle 58 between vertical line 54 and a plane 60 along the longitudinal length of lens 36 is further shown in FIG. 2. Holder 32 orients detector 34 and lens 36 such that plane 56 of detector 34 and plane 60 of lens 36 are offset from one another. This offset is generally indicated by the difference in angular measure between first and second angles 52 and 58. Respective surfaces 62 and 64 of detector 34 and lens 36 are reflective. These reflective surfaces can cause internal reflections that create standing waves of infrared energy. These standing waves can impair the sensitivity of detector 34 because detector 34 receives these reflected standing waves in addition to infrared radiation from other sources. However, by offsetting plane 56 of detector 34 from plane 60 of lens 36, these internal reflections can be reduced. In one embodiment of the present invention, plane 56 of detector 34 is offset from plane 60 of lens 36 by approximately five degrees.

Although housing 10 is shown mounted in a work station area 12, it is to be understood that housing 10 may be placed in other locations such as a shelf or floor. These other possible locations of housing 10 may require changes in the orientation and positioning of such things as louvers 18 and motion sensor assembly 30 within housing 10.

In operation, a person would enter field of view 24 to begin work at work station area 12. The person would radiate infrared energy that would be received by motion sensor assembly 30. Assembly 30 would turn on lamp 26. When the person completed work, they would leave work station area 12. Infrared energy would no longer be received by motion sensor assembly 30 and assembly 30 would turn lamp 26 off.

Figure 3:
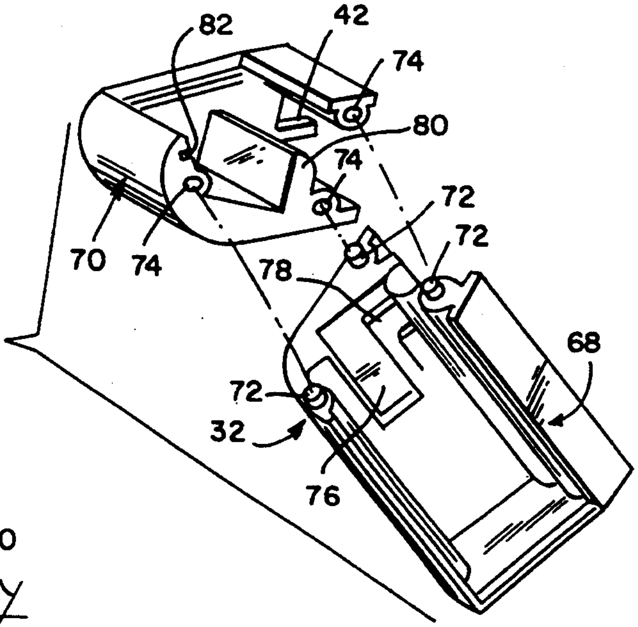
FIG. 3 is an exploded view of the two-piece holder of the present invention.

FIG. 3 shows an exploded perspective view of holder 32 of motion sensor assembly 30 of the present invention. Holder 32 is shown as having first and second pieces 68 and 70. First piece 68 is shown as having a plurality of plugs 72 formed thereon. Second piece 70 is shown as having a plurality of sockets 74 formed therein. First and second pieces 68 and 70 are matingly connected together via reception of plugs 72 in sockets 74.

A slot 76 on first piece 68 receives detector 34 therein. An end 78 of slot 76 is open. Open end 78 of slot 76 allows detector 34 to be inserted into slot 76. A stop 80 formed on second piece 70 abuts open end 78 of slot 76 when first and second pieces 68 and 70 are matingly connected together. Stop 80 secures detector 34 within slot 76.

A groove 82 formed on first and second pieces 68 and 70 of holder 32 receives and secures a periphery 84 (see FIG. 2) of lens 36. As discussed in connection with FIG. 2, slot 76 and groove 82 may be oriented relative to one another to reduce internal reflections of infrared light energy between surfaces 62 and 64 of respective detector 34 and lens 36.

Holder 32 is larger than detector 34 and has a higher thermal mass than detector 34. Such construction allows holder 32 to form a sink that absorbs some of the heat energy. A sink is provided because excessive heat energy absorbed by detector 34 can impair its sensitivity.

Figure 4:
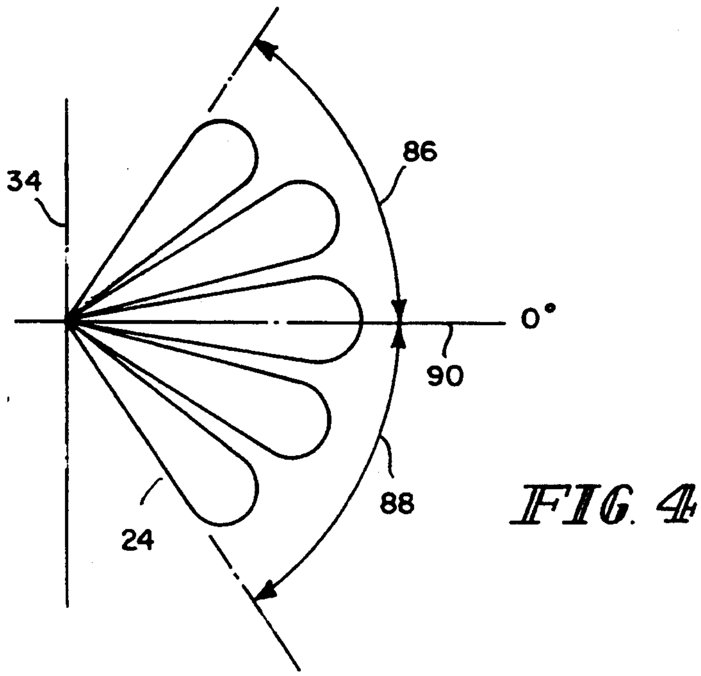
FIG. 4 is an illustration of a generally lateral field of view for an embodiment of the motion sensor assembly of the present invention.

FIG. 4 shows a diagrammatic illustration of a field of view 24 focused on detector 34 of an embodiment of the present invention having a five-element Fresnel lens (not shown). Field of view 24 is shown in FIG. 4 as seen from a perspective or aspect that is substantially perpendicular to faces 20 of louvers 18 shown in FIG. 2. The field of view 24 focused on detector 34 by the Fresnel lens covers an area generally indicated by first and second angles 86 and 88 lying on opposite sides of line 90. In one embodiment of the present invention, angles 86 and 88 are both greater than 45° such that field of view 24 covers an area in excess of 90°.

Figure 5:
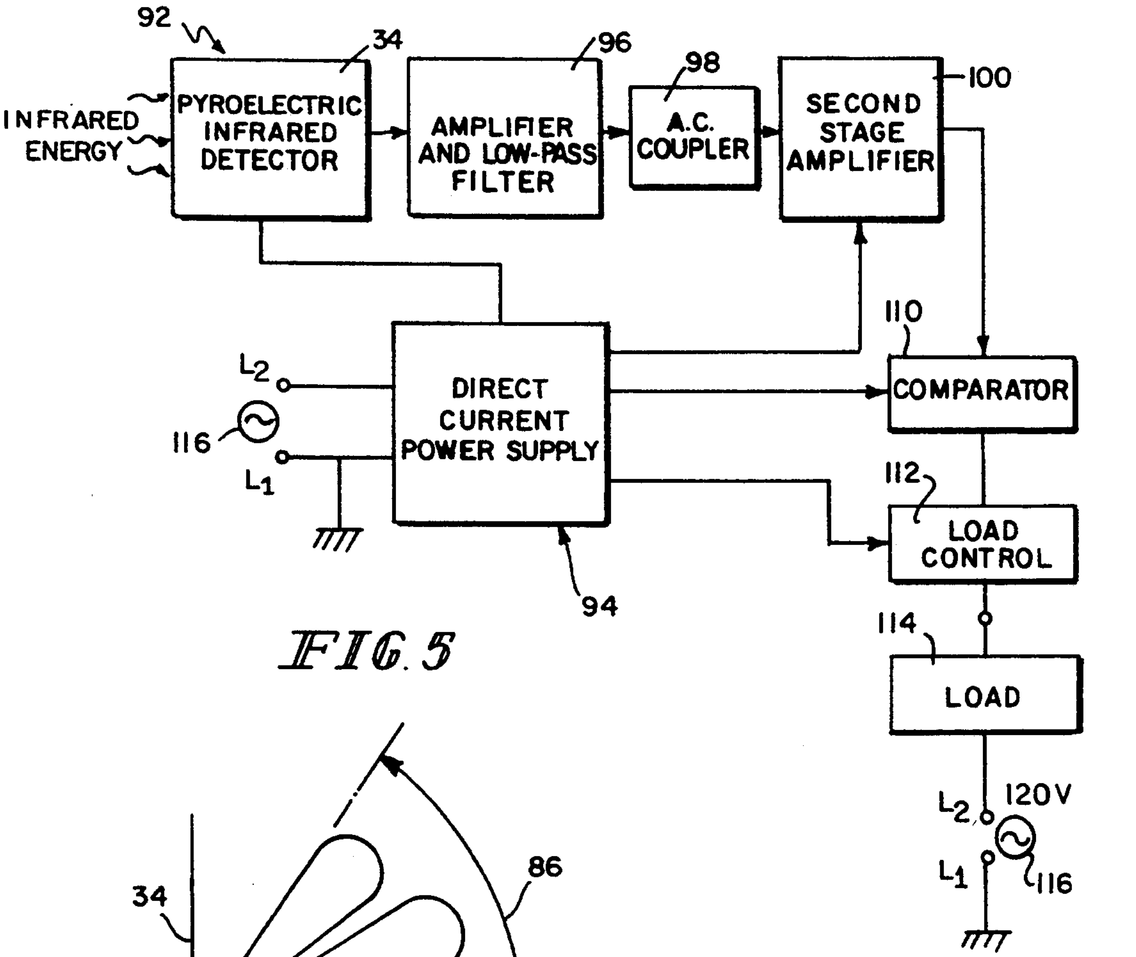
FIG. 5 is a block diagram of the alarm signal circuit and transformerless direct current power supply of the motion sensor assembly of the present invention.

FIG. 5 shows a block diagram of switch circuit 92 and transformerless direct current power supply 94 of the motion sensor assembly 30 of the present invention. Pyroelectric infrared detector 34 is shown, as is a source of infrared energy 50. Detector 34 produces an output signal responsive to infrared energy 50 radiated from a source in field of view 24. First-stage amplifier and low-pass filter 96 amplifies the output signal of detector 34 and filters the output signal to reduce electrical noise. The output of first stage amplifier and low pass filter 96 is electrically connected via AC coupler 98 to a second-stage amplifier 100. Second-stage amplifier 100 amplifies the change in the output signal of detector 34 caused by infrared energy 50 radiated from a source in field of view 24. A comparator 110 compares an output signal of second-stage amplifier 100 to a predetermined range of values. Comparator 110 outputs a signal to a load control 112 when the output signal of second-stage amplifier 100 is outside the range of values. Load control 112 in turn drives load 114 which is connected on one side to a 120 volt alternating current power source 116.

FIG. 5 also shows direct current power supply 94 providing power to detector 34 and switch circuit 92. Direct current power supply 94 is also shown receiving power from 120 volt alternating current power source 116. As can be seen from FIG. 5, neutral conductor L1 of power source 116 is connected to earth potential.

Figure 6:
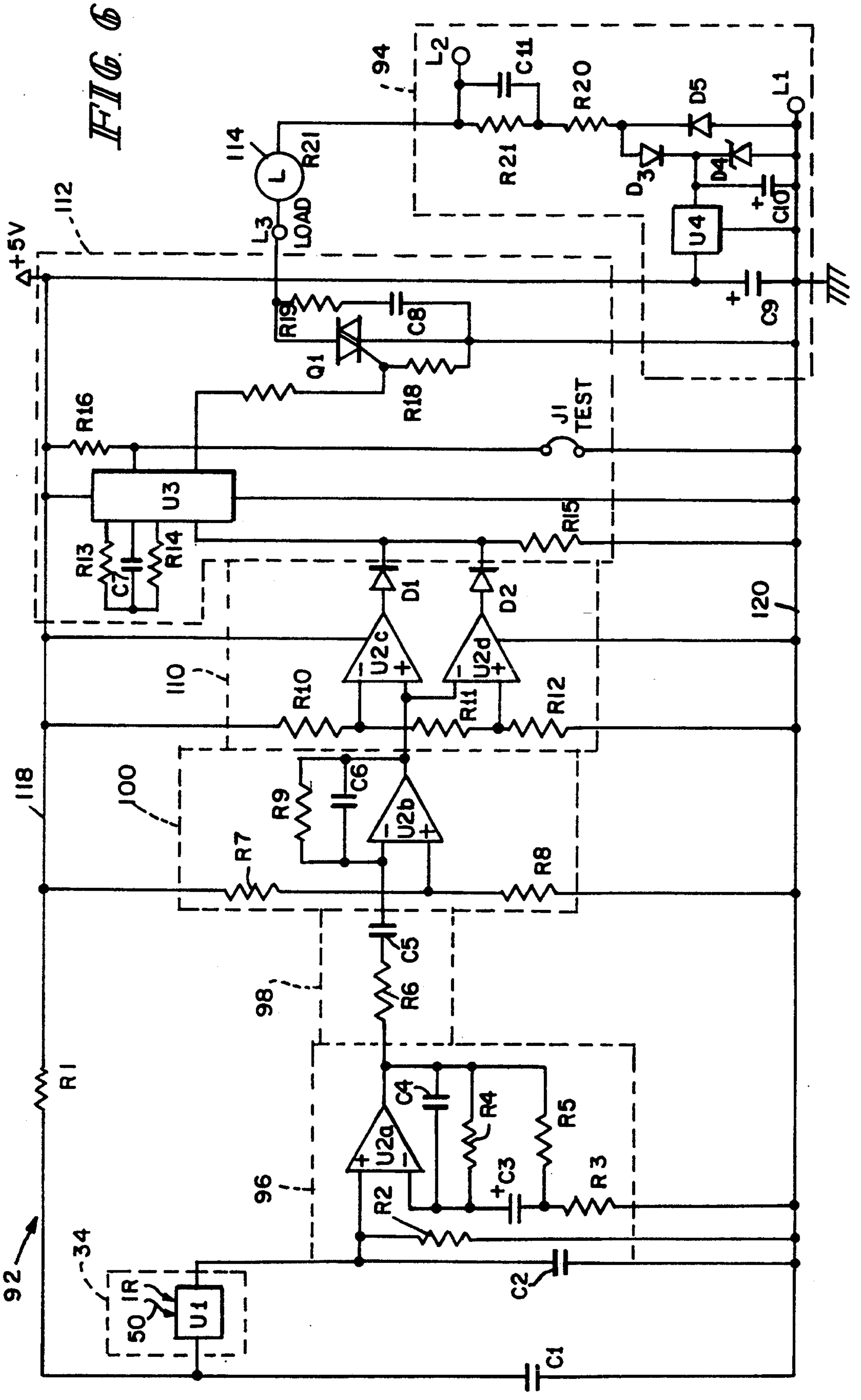
FIG. 6 is a circuit schematic of an embodiment of the alarm signal circuit and transformerless direct current power supply of the motion sensor assembly described by the block diagram of FIG. 5.

FIG. 6 shows one embodiment of a circuit for the block diagram of FIG. 5. Although a specific electrical configuration for the block diagram of FIG. 5 is shown, it is to be understood that functionally equivalent circuit configurations are within the scope and spirit of the present invention. First-stage amplifier and low pass filter 96 is shown as being constructed from an operational amplifier U2*a* interconnected with a plurality of capacitors C2–C4 and resistors R2–R5. AC coupler 98 is shown as comprising resistor R6 and capacitor C5. Second-stage amplifier 100 is shown as comprising operational amplifier U2*b* and resistors R7 through R9 and capacitor C6. Comparator 110 is shown as comprising operational amplifiers U2*c* and U2*d*, a voltage divider formed by resistors R10–R12, and diodes D1 and D2. The voltage divider formed by resistors R10–R12 provides the predetermined range of values for comparison by comparator 110 as discussed above in connection with FIG. 5. The outputs of operational amplifiers U2*c* and U2*d* are connected via diodes D1 and D2 to a timer U3 of load control 112. An R-C oscillator consisting of resistors R13 and R14 and capacitor C7 is connected to timer U3. When timer U3 is triggered by comparator 110, it activates triac Q1 to drive load 114. Load 114 may be a fluorescent lamp. A jumper J1 can be used to control the number of oscillations of timer U3. When jumper J1 is removed, timer U3 will count 32,768 oscillations before resetting. With jumper J1 in place, timer U3 will count 64 oscillations before resetting. Jumper J1 can thus be placed in the circuit of FIG. 6 to test the operation thereof. After testing, jumper J1 can be removed.

A schematic for the transformerless direct current power supply 94 is also shown in FIG. 6. Alternating current power source 116 is fed into power supply 94 between lines L1 and L2. As discussed above in connection with FIG. 5, neutral conductor L1 of power source 116 is at earth potential. A 15 volt potential is developed across zener diode D4 and fed into voltage regulator U4 to produce a regulated output of five volts between line bus 118 and common bus 120. As can be seen from the circuit of FIG. 6, neutral conductor L1 of alternating current power source 116 and direct current common bus 120 of direct current power supply 94 are both at earth potential. Such configuration reduces the susceptibility of detector 34 to interference caused by noise on alternating current power source 116.

Capacitor C11 is shown connected between line conductor L2 of alternating current power source 116 and an input path to regulator U4. Capacitor C11 shifts a phase angle of an alternating current drawn by direct current power supply 94 from alternating current power supply 116. The alternating current is phase-shifted so as to be out of phase with an alternating voltage drawn by direct current power supply 94 from alternating current power supply 116. The phase angle of the alternating current drawn by direct current power supply 94 is phase-shifted to reduce the real power consumed by direct current power supply 94.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A motion sensor assembly, comprising:

a housing having an interior space bounded by at least one wall, the wall having at least one opening therein;

an infrared detector;

a lens;

a radiation-permeable covering disposed in the opening to conceal the interior space of the housing from view;

means positioned to lie within the space of the housing adjacent the radiation permeable covering for mounting the infrared detector and lens adjacent one another within the housing in a fixed relative orientation to focus a field of view through the radiation permeable covering onto the detector and reduce internal reflections between the lens and the detector so that when a source of infrared radiation enters the field of view, the infrared radiation from the source passes through the radiation permeable covering, is focused on the infrared detector by the lens, and causes the detector to output a signal responsive to the infrared energy radiated from the source; and circuit means for providing a signal in response to the output signal of the detector.

2. The motion sensor assembly of claim 1, wherein the mounting means is a two-piece holder having means for receiving and securing the detector and means for receiving and securing the lens adjacent the detector.

3. The motion sensor assembly of claim 2, wherein the detector receiving and securing means comprises a slot into which the detector is disposed and wherein the lens receiving and securing means comprises a groove formed in a portion of the holder that receives a periphery of the lens.

4. The motion sensor assembly of claim 2, wherein the holder forms a sink for infrared energy absorbed by the detector.

5. The motion sensor assembly of claim 1, wherein the radiation permeable covering comprises a plurality of louvers.

6. The motion sensor assembly of claim 5, wherein the louvers are integrally formed with the housing.

7. The motion sensor assembly of claim 1, wherein the lens is a Fresnel lens having at least one lens element that focuses one field of view on the detector.

8. The motion sensor assembly of claim 7, wherein the Fresnel lens comprises five lens elements that focus five fields of view on the detector.

9. The motion sensor assembly of claim 8, wherein at least one aspect of a confined field of view covered by the detector is greater than 90°.

10. The motion sensor assembly of claim 1, wherein the lens and detector are mounted in the housing so that a plane along a longitudinal length of the lens is offset from a plane along a longitudinal length of the detector so as to reduce internal reflections between the lens and the detector.

11. The motion sensor assembly of claim 10, wherein the plane of the lens and the plane of the detector are offset by approximately five degrees.

12. The motion sensor assembly of claim 1, further comprising a circuit board on which at least a portion of the circuit means is mounted, the circuit board being secured to the housing.

13. The motion sensor assembly of claim 12, further comprising means on the mounting means for attaching the mounting means to the circuit board.

14. The motion sensor assembly of claim 13, wherein the attaching means comprises at least one post integrally formed on the mounting means.

15. The motion sensor assembly of claim 1, wherein the circuit means comprises an amplifier having an input that receives the output signal of the detector, a comparator having an input electrically connected to an output of the amplifier, a load control having an input electrically connected to an output of the comparator, and a load electrically connected between an output of the load control and a source of alternating current power.

16. The motion sensor assembly of claim 14, further comprising a transformerless direct current power supply connected to the alternating current power source and having a direct current common bus connected to a neutral conductor of the alternating current power source, wherein the common bus and neutral conductor are both connected to earth potential.

17. A motion sensor assembly, comprising:

an infrared detector;

a lens;

a holder having a body;

means formed on the body for receiving and securing the lens in the holder; and means formed on the body for receiving and securing the infrared detector in the holder such that a plane along a longitudinal length of the lens is offset from a plane along a longitudinal length of the detector so as to reduce internal reflections between the lens and the detector.

18. The motion sensor assembly of claim 17, wherein the body is a two-piece assembly having first and second pieces.

19. The motion sensor assembly of claim 18, wherein the first and second pieces have means formed thereon for matingly connecting with one another.

20. The motion sensor assembly of claim 19, wherein the mating means comprises at least one plug formed on the first body piece that is received in a corresponding socket formed in the second body piece.

21. The motion sensor assembly of claim 17, further comprising means formed on the body for mounting the holder adjacent an opening in a housing such that no portion of the motion sensor assembly extends through the opening and the motion sensor assembly is concealed from view within an interior space of the housing.

22. The motion sensor assembly of claim 21, wherein the mounting means comprises at least one post on the body for attachment to a circuit board mounted to the housing.

23. The motion sensor assembly of claim 22, wherein the body, lens, and circuit board form a seal around the detector to shield the detector from air currents that can affect the sensitivity of the detector.

24. The motion sensor assembly of claim 17, wherein the lens receiving and securing means comprises a groove formed in a portion of the body that receives a periphery of the lens.

25. The motion sensor assembly of claim 17, wherein the detector receiving and securing means comprises a slot into which the detector is disposed.

26. The motion sensor assembly of claim 25, wherein the body is a two-piece assembly having first and second mating pieces, wherein the slot is formed on the first piece and is open on one end, and wherein a stop is formed on the second piece that lies adjacent the open end of the slot when the first and second pieces are matingly connected.

27. The motion sensor assembly of claim 17, wherein the plane of the lens and the plane of the detector are offset by approximately five degrees.

28. The motion sensor assembly of claim 17, wherein the body forms a sink for infrared energy absorbed by the detector.

29. The motion sensor assembly of claim 17, wherein the lens is a Fresnel lens having at least one lens element.

30. A motion sensor assembly, comprising:

an infrared detector, the detector outputting a signal responsive to infrared energy radiated from a source;

a lens, the lens and detector being oriented so that the lens focuses a field of view on the detector so that when the source of infrared radiation moves across the field of view, the detector outputs the signal responsive to the infrared energy radiated from the source;

circuit means for providing a signal in response to the output signal of the detector; and a transformerless direct current power supply connected to an alternating current power source and having a direct current common bus connected to a neutral conductor of the alternating current power source, wherein the common bus and neutral conductor are both connected to earth potential.

31. The motion sensor assembly of claim 30, wherein the circuit means comprises an amplifier having an input that receives the output signal of the detector, a comparator having an input electrically connected to an output of the amplifier, a load control having an input electrically connected to an output of the comparator, and a load electrically connected between an output of the load control and the alternating current power source.

32. The motion sensor assembly of claim 31, wherein the amplifier comprises first- and second-stages, the first-stage amplifying the output signal of the detector and filtering the output signal of the detector to reduce electrical noise, an output of the first-stage being capacitively coupled to an input of the second stage, and the second-stage amplifying the change in detector output caused by motion of the source in the field of view.

33. The motion sensor assembly of claim 31, wherein the comparator compares a signal output of the amplifier to determine whether the signal output of the amplifier is within a range of values set by a voltage divider of the comparator and outputs a signal to the load control when the signal output of the amplifier is outside the range of values.

34. The motion sensor assembly of claim 33, wherein the load control comprises a timer, an input of which is electrically connected to an output of the comparator so as to be triggered by the signal output of the comparator and a triac, an input of which is electrically connected to an output of the timer and an output of which is electrically connected to the load.

35. The motion sensor assembly of claim 34, wherein the load comprises a lamp.

36. The motion sensor assembly of claim 30, further comprising means connected between an input of the transformerless direct current power supply and a line conductor of the alternating current power source for shifting a phase angle of an alternating current drawn by the transformerless direct current power supply from the alternating current power source such that the alternating current drawn by the transformerless direct current power supply is out of phase with an alternating voltage drawn by the transformerless direct current power supply from the alternating current power source so as to reduce the real power consumed by the transformerless direct current power supply.

37. The motion sensor assembly of claim 36, wherein the phase shifting means comprises a capacitor connected in series with the input of the direct current power supply and the line conductor of the alternating current power source.

38. A motion sensor assembly, comprising:

a housing having an interior space bounded by at least one wall, the wall having at least one opening therein;

an infrared detector;

a lens;

means for mounting the lens adjacent the infrared detector and the opening in the wall such that the lens focuses a field of view on the detector so that when a source of infrared radiation moves across the field of view, the detector outputs a signal responsive to infrared energy radiated from the source;

a radiation-permeable covering disposed in the opening to conceal elements of the assembly within the interior space of the housing from view;

circuit means for providing a signal in response to the output signal of the detector; and wherein the circuit means comprises an amplifier having an input that receives the output signal of the detector, a comparator having an input electrically connected to an output of the amplifier, a load control having an input electrically connected to an output of the comparator, and a load electrically connected between an output of the load control and a source of alternating current power.

39. The motion sensor assembly of claim 38, further comprising a transformerless direct current power supply connected to the alternating current power source and having a direct current common bus connected to a neutral conductor of the alternating current power source, wherein the common bus and neutral conductor are both connected to earth potential.

* * * * *